(12) United States Patent
Li et al.

(10) Patent No.: US 10,047,519 B2
(45) Date of Patent: Aug. 14, 2018

(54) INFLATABLE WALL MATERIAL, COLD STORAGE HOUSE USING THE SAME, AND AIR-CONDITIONED STOREHOUSE USING THE SAME

(75) Inventors: Xihong Li, Tianjin (CN); Yunbin Jiang, Tianjin (CN); Yage Xing, Tianjin (CN); Shulai Lu, Tianjin (CN); Xiufeng Liu, Tianjin (CN); Weili Li, Tianjin (CN); Chongxiao Shao, Tianjin (CN); Haidong Liu, Tianjin (CN)

(73) Assignee: Tianjin Gasin-DH Preservation Technologies Co., Ltd., Tianjin (CN)

( * ) Notice: Subject to any disclaimer, the term of this patent is extended or adjusted under 35 U.S.C. 154(b) by 1282 days.

(21) Appl. No.: 13/494,987

(22) Filed: Jun. 12, 2012

(65) Prior Publication Data

US 2012/0255707 A1 Oct. 11, 2012

Related U.S. Application Data

(63) Continuation-in-part of application No. PCT/CN2010/078054, filed on Oct. 25, 2010.

(30) Foreign Application Priority Data

Sep. 17, 2010 (CN) .......................... 2010 1 0285310

(51) Int. Cl.
*B32B 15/08* (2006.01)
*E04B 1/78* (2006.01)
(Continued)

(52) U.S. Cl.
CPC .................. *E04B 1/78* (2013.01); *B32B 5/02* (2013.01); *B32B 5/18* (2013.01); *B32B 5/245* (2013.01);
(Continued)

(58) Field of Classification Search
CPC . E04B 1/78; E04B 2001/7691; B32B 27/065; B32B 15/14; B32B 2607/00; B32B 5/245; B32B 27/304; B32B 27/08; B32B 15/20; B32B 5/02; B32B 2250/05; B32B 27/12; B32B 2419/00; B32B 5/18;
(Continued)

(56) References Cited

U.S. PATENT DOCUMENTS 2,823,683 A * 2/1958 Smith ...................... A01G 9/16
135/118
2,951,608 A * 9/1960 Morrison .................. B60P 3/20
105/392.5

(Continued)

*Primary Examiner* — Gregory Huson
*Assistant Examiner* — Martha Becton
(74) *Attorney, Agent, or Firm* — Matthias Scholl P.C.; Matthias Scholl

(57) ABSTRACT

An inflatable wall material, including: a thermal insulation layer, a first metal layer, a barrier layer, a buffer layer, a protective layer, and a second metal layer. The first metal layer, the barrier layer, the buffer layer, the protective layer, and the second metal layer are arranged on two sides of the thermal insulation layer in sequence from the inside to the outside. The two barrier layers on the two sides of the thermal insulation layer employ air-tight materials. The two barrier layers and the first metal layers on the two sides of the thermal insulation layer constitute an inflatable air-tight space. The thermal insulation layer is positioned in the air-tight space.

11 Claims, 8 Drawing Sheets

(51) Int. Cl.
  *B32B 5/02* (2006.01)
  *B32B 5/18* (2006.01)
  *B32B 5/24* (2006.01)
  *B32B 15/14* (2006.01)
  *B32B 15/20* (2006.01)
  *B32B 27/06* (2006.01)
  *B32B 27/08* (2006.01)
  *B32B 27/12* (2006.01)
  *B32B 27/30* (2006.01)
  *E04H 15/20* (2006.01)
  *E04B 1/76* (2006.01)

(52) U.S. Cl.
  CPC ............ *B32B 15/08* (2013.01); *B32B 15/14* (2013.01); *B32B 15/20* (2013.01); *B32B 27/065* (2013.01); *B32B 27/08* (2013.01); *B32B 27/12* (2013.01); *B32B 27/304* (2013.01); *E04H 15/20* (2013.01); *B32B 2250/05* (2013.01); *B32B 2250/40* (2013.01); *B32B 2307/304* (2013.01); *B32B 2307/7242* (2013.01); *B32B 2419/00* (2013.01); *B32B 2607/00* (2013.01); *E04B 2001/7691* (2013.01); *E04H 2015/203* (2013.01)

(58) Field of Classification Search
  CPC ........ B32B 2307/7242; B32B 2250/40; B32B 15/08; B32B 2307/304; E04H 2015/203; E04H 15/20
  USPC ................................. 165/56; 52/2.22; 428/12
  See application file for complete search history.

(56) References Cited

U.S. PATENT DOCUMENTS

| | | | | | |
|---|---|---|---|---|---|
| 3,059,655 | A | * | 10/1962 | Bird | E04H 15/22 119/436 |
| 3,160,307 | A | * | 12/1964 | Morrison | B65D 11/1873 165/135 |
| 3,161,553 | A | * | 12/1964 | Visser | B29C 70/10 156/156 |
| 3,256,895 | A | * | 6/1966 | Duquette | E04H 15/22 52/2.17 |
| 3,390,491 | A | * | 7/1968 | Hayden | E04H 15/20 174/379 |
| 3,552,466 | A | * | 1/1971 | Fairchilds | B65D 90/02 206/386 |
| 3,742,657 | A | * | 7/1973 | Price | E04H 15/22 52/2.14 |
| 3,751,862 | A | * | 8/1973 | Linecker | E04H 15/20 135/119 |
| 3,776,805 | A | * | 12/1973 | Hansen | B29D 11/00596 428/174 |
| 3,779,847 | A | * | 12/1973 | Turner | E04H 15/20 156/156 |
| 3,842,454 | A | * | 10/1974 | Young | 5/413 R |
| 3,844,339 | A | * | 10/1974 | Kranz | E04H 15/20 165/46 |
| 4,016,702 | A | * | 4/1977 | Nakada | B29C 44/181 52/2.15 |
| 4,021,972 | A | * | 5/1977 | Choate et al. | 52/2.15 |
| 4,024,679 | A | * | 5/1977 | Rain | E04H 15/20 359/890 |
| 4,155,967 | A | * | 5/1979 | South | E04B 1/169 249/65 |
| 4,170,093 | A | * | 10/1979 | Cappellini | E04B 1/169 264/32 |
| 4,186,530 | A | * | 2/1980 | Fraioli | E04H 15/20 52/2.19 |
| 4,365,455 | A | * | 12/1982 | Braine | E04B 1/164 264/32 |
| 4,395,455 | A | * | 7/1983 | Frankosky | 428/332 |
| 4,477,503 | A | * | 10/1984 | Fraioli | E04H 15/22 428/102 |
| 4,486,492 | A | * | 12/1984 | Ziliotto | A41D 31/02 428/314.4 |
| 4,621,013 | A | * | 11/1986 | Holtrop | B32B 5/32 428/304.4 |
| 4,705,717 | A | * | 11/1987 | Cain | B32B 7/02 135/87 |
| 4,937,125 | A | * | 6/1990 | Sanmartin | B32B 3/12 428/116 |
| 5,393,598 | A | * | 2/1995 | Schlecker | B32B 27/12 428/102 |
| 5,441,170 | A | * | 8/1995 | Bane, III | B65D 5/48024 206/523 |
| 5,477,699 | A | * | 12/1995 | Guess et al. | 62/187 |
| 5,813,172 | A | * | 9/1998 | McNally | A63H 33/008 446/111 |
| 6,108,980 | A | * | 8/2000 | Braun | E04H 15/20 135/136 |
| 6,599,850 | B1 | * | 7/2003 | Heifetz | B32B 15/14 428/91 |
| 6,910,235 | B2 | * | 6/2005 | Lack et al. | 5/413 AM |
| 7,882,849 | B2 | * | 2/2011 | Franta | E04H 15/001 135/115 |
| 7,935,411 | B2 | * | 5/2011 | Orologio | B32B 3/28 156/145 |
| 9,340,994 | B2 | * | 5/2016 | Hotes | E04H 15/36 |
| 2006/0148071 | A1 | * | 7/2006 | Bauer | C05F 17/0258 435/290.1 |
| 2006/0249190 | A1 | * | 11/2006 | Fritzsche | E04H 15/20 135/116 |
| 2008/0017229 | A1 | * | 1/2008 | Brewin | E04B 1/169 135/87 |
| 2009/0320380 | A1 | * | 12/2009 | Chelf | A01G 9/1407 52/2.11 |
| 2010/0139197 | A1 | * | 6/2010 | Woodhall | B32B 5/26 52/404.1 |
| 2010/0140401 | A1 | * | 6/2010 | Von Ballmoos | B64D 11/00 244/118.6 |
| 2010/0269449 | A1 | * | 10/2010 | Bush | A62C 2/06 52/741.3 |
| 2011/0130062 | A1 | * | 6/2011 | Squires | B32B 7/02 442/327 |
| 2013/0104947 | A1 | * | 5/2013 | Hotes | E04H 9/16 135/96 |

* cited by examiner

INFLATABLE WALL MATERIAL, COLD STORAGE HOUSE USING THE SAME, AND AIR-CONDITIONED STOREHOUSE USING THE SAME

CROSS-REFERENCE TO RELATED APPLICATIONS

This application is a continuation-in-part of International Patent Application No. PCT/CN2010/078054 with an international filing date of Oct. 25, 2010, designating the United States, now pending, and further claims priority benefits to Chinese Patent Application No. 201010285310.4 filed Sep. 17, 2010. The contents of all of the aforementioned applications, including any intervening amendments thereto, are incorporated herein by reference.

CORRESPONDENCE ADDRESS

Inquiries from the public to applicants or assignees concerning this document should be directed to: MATTHIAS SCHOLL P.C., ATTN.: DR. MATTHIAS SCHOLL ESQ., 14781 MEMORIAL DRIVE, SUITE 1319, HOUSTON, Tex. 77079.

BACKGROUND OF THE INVENTION

Field of the Invention

The invention relates to an inflatable wall material and a cold storage house or an air-conditioned storehouse using the same.

Conventional cold storage houses/air-conditioned storehouses mainly adopt a civil construction type and assembly type. However, the construction period is long, the vacancy rate is high, the mobility is poor, and the land resources are occupied.

For example, a conventional portable energy-saving cold storage house adopts a hollow semi-ellipsoidal integral structure. The inner surface and the outer surface of the wall of the semi-ellipsoidal cold storage house are composed of waterproof non-breathable fabrics, and an inflated threadlike cavernous body with cellular pores is sandwiched between the inner surface and the outer surface. The portable energy-saving cold storage house is inflated in use, and can be stored in a folded manner when not in use.

However, the heat-insulation effect of the cold storage house is not ideal, the yield force is large during the folding process, the cold storage house is difficult to fold manually, the folded cold storage house is excessively large, the portability is not remarkable, and the firmness of the cold storage house supported only by its material after inflation is also restricted.

SUMMARY OF THE INVENTION

In view of the above-described problems, it is one objective of the invention to provide an inflatable wall material with a good heat-insulation effect and excellent mechanical properties. The inflatable wall material can be used for rapidly building houses, storehouses, etc.

It is another objective of the invention to provide a cold storage house or an air-conditioned storehouse built using the inflatable wall material.

To achieve the above objectives, in accordance with one embodiment of the invention, there is provided an inflatable wall material, comprising a thermal insulation layer, wherein a first metal layer, a barrier layer, a buffer layer, a protective layer, and a second metal layer are arranged on two sides of the thermal insulation layer in sequence from inside to outside.

In a class of this embodiment, the first metal layers on the two sides of the thermal insulation layer are made of the same or different materials.

In a class of this embodiment, the barrier layers, the buffer layers, the protective layers, or the second metal layers on the two sides of the thermal insulation layer are made of the same or different materials.

To ensure the good thermal insulation effect and physical properties, the wall material adopts a multilayer structure. The thermal insulation layer is arranged in the middle, and both the two barrier layers on the two sides of the thermal insulation layer adopt air-tight materials. The two barrier layers and the first metal layers on the two sides of the thermal insulation layer constitute an inflatable air-tight space. The thermal insulation layer is positioned in the air-tight space, an inflation inlet formed on the outer surface of the wall material is communicated with the air-tight space, and a sealing valve is arranged at the inflation inlet.

In a class of this embodiment, the thermal insulation layer employs hollow three-dimensional crimp elastic cotton, which has a heat-insulation effect and plays the role of supporting; the thermal insulation layer can adopt polypropylene elastic cotton (isotactic polypropylene), polyester elastic cotton, acrylic elastic cotton, polyamide elastic cotton, or a mixture thereof.

In a class of this embodiment, to obtain a good strength, the fibers of various elastic cotton fabrics generally adopt hollow three-dimensional crimp fibers. The thickness of the thermal insulation layer is 50-200 mm, the solid-phase density is 0.07-1 $g/m^3$, the denier is 6-7 dtex, the number of crimp is 3-5 per cm, and the compressive elasticity is 38-45%.

In a class of this embodiment, the thermal insulation layer, the first metal layers and the barrier layers which are arranged on the two sides of the thermal insulation layer constitute an air-tight thermal insulation structure. The gap of the non-solid phase space (i.e., the width of gas in the gap in the thermal insulation layer) of the thermal insulation layer in use is smaller than 5 mm, so that the gaseous thermal-conduction resistance and the convection value are optimum when the low thermal conductivity of gas takes a leading role.

In a class of this embodiment, both the first metal layer and the second metal layer are made from aluminum-titanium alloy, aluminum foil, or a mixture thereof, and employ a single-layer structure or a multi-layer structure, and the material of each layer is the same or different when the multi-layer structure is employed. The metal layer (the first metal layer or the second metal layer) is 0.006-0.009 mm in thickness and 1.9-2.5 $g/m^2$ in amount of coating; or the metal surface layer is compounded with a wadding flake basal layer using a needle punching method. The radiation coefficient is lowered, the reflection coefficient is improved, and the blackness is 0.2-0.40.

As to the wall material, the second metal layer is positioned on the outermost side and mainly used for reflecting radiation heat of sun and other heat resources; the first metal layer is positioned on the inner side and mainly used for cold reflection and suppression of convection.

The barrier layer is also called an air barrier, and made from a water-resistant and air-resistant polymer material, i.e., PVC (polyvinyl chloride) film, PE (polyethylene) film, OPP (polypropylene) film, or a mixture thereof; the barrier layer can adopt a single-layer structure or a multi-layer structure, and the material of each layer is the same or different when the multi-layer structure is adopted; the barrier layer can prevent the infiltration of gas, water vapor, and heat, and heat transfer, is 0.05-0.12 mm in thickness, meets the requirement of good air tightness, and is in the barotropic state in use.

In a class of this embodiment, the protective layer is made from a water-resistant polymer material, i.e., PVC (polyvinyl chloride) cloth, nonwoven fabric, rainproof silk, fabric-base silicon rubber cloth, nylon cloth, or a mixture thereof. The protective layer can adopt a single-layer structure or a multi-layer structure, and the material of each layer can be the same or different when the multi-layer structure is adopted. The protective layer has various functions such as water resistance, enhancement, dust prevention, protection against rodents, aging resistance, and corrosion resistance, has the barrier effect and thermal insulation effect, and is 1-1.5 mm in thickness.

In a class of this embodiment, the buffer layer is made from expanded polyethylene, expanded crosslinked polyethylene, foamed rubber, soft expanded polyurethane, or a mixture thereof, and can adopt a single-layer structure or a multi-layer structure, and the material of each layer can be the same or different when the multi-layer structure is adopted. The buffer layer is mainly used for buffering the impact from external force, can prevent moisture, slow down cold or heat and conduction, and is 5-15 mm in design thickness.

In a class of this embodiment, the inflatable wall material comprises an 11-layer structure, the edges required to be sealed between every two layers and between the adjacent layers are bonded with an adhesive, and the adhesive adopts conventional antioxidant latex, etc.

In accordance with another embodiment of the invention, the invention provides an inflatable cold storage house, comprising four walls and a top, and both the four walls and the top employ the inflatable wall material.

A heat exchanger and a ventilating device can be placed in the cold storage house, for example, an indoor unit of an air conditioner.

In a class of this embodiment, the inflatable cold storage house further comprises a bottom, and the bottom also adopts the inflatable wall material. The bottom is opposite to the top, the edges of the bottom and the top are closed by the four walls. The four walls can be encircled by four side walls with obvious corners, and also can adopt shapes, for example, cylindrical. Considering the processing and installation, preferably, the four walls are encircled by four side walls, so that both the bottom and top are correspondingly quadrilateral.

In a class of this embodiment, each side wall, the bottom, and the top can adopt independent wall materials, that is, the cavities inflated with air each other are mutually isolated, or at least two adjacent parts is manufactured into an integral structure, that is, the cavities inflated with air each other are mutually communicated.

In a class of this embodiment, the bottom adopts an integral structure with two opposite side walls, that is, the bottom and the two opposite side walls are formed by bending a piece of wall material. The top adopts an integral structure with another two opposite side walls, that is, the top and the two opposite side walls are formed by bending another piece of wall material. That is, the whole cold storage house is made of the two wall materials.

In a class of this embodiment, the top employs a spherical crown shaped or tegular vault, and doors and windows are arranged on the side walls as required.

Connection gaps between the two wall materials can be connected through zippers or by binding sticky buckles. To ensure the overall strength of the cold storage house, a plurality of portal supporting frames are arranged, and the top and/or side walls are tightened on a portal supporting frame through slings. Certainly, the supporting frame can employ other shapes, and the number of the supporting frame is determined according to the external dimension of the cold storage house.

The sling can employ synthetic fiber or metal, and the joints between the sling and the top and/or side walls can be locally strengthened, that is, the thickness of the outermost layer or the multiple layers on the outermost side of the top and/or side walls is increased appropriately, or a layer of reinforcing material is pasted at the corresponding part of the top and/or side walls.

In a class of this embodiment, in the wall material of the cold storage house, at least a part of sandwich area with a gap is arranged between the protective layer and the buffer layer which are positioned on one side of the inner wall of the cold storage house, and the sandwich area serves as a cold air circulation passage.

To state conveniently, the four walls of the cold storage house comprises a first side wall, a second side wall, a third side wall, and a fourth side wall which are connected in sequence. The second side wall is positioned on the front side of the cold storage house and provided with a door. The fourth side wall is positioned on the rear side of the cold storage house. The first side wall and the third side wall are positioned on the left side wall and the right side wall of the cold storage house, respectively, and adopt an integral structure with the top of the cold storage house.

In the wall material, a gap is left between the protective layer on one side of the inner wall of the cold storage house and the second metal layer and the buffer layer which are arranged on the inner side of the inner wall of the cold storage house, that is, the protective layer and the buffer layer which are positioned on the side of the inner wall of the cold storage are not closely stuck with each other, and a sandwich structure is adopted between the protective layer and the buffer layer.

A heat exchanger and a ventilating device (a fan or blower) are arranged in the sandwich area, for example, an indoor unit of an air conditioner, so that cold air can be delivered and circulate in the cold air circulation passage formed in the sandwich structure, or can be directly input into the sandwich area through a pipeline.

To form an effective circulated air passage in the cold air circulation passage, guide plates used for reasonably separating the cold air circulation passage can be arranged, wherein an air inlet and an air outlet of the ventilating device correspond to an air outlet part and an air inlet part of the cold air circulation passage, respectively, so as to realize the circulation of cold air.

To ensure more reasonable and more uniform air flow distribution in the sandwich structure, grid plates with holes can be arranged for changing the airflow direction. The grid plates can adopt a foldable material, for example, commonly-used polymer plastic film.

A sandwich area with a gap is formed between the protective layer and the buffer layer positioned on one side of the inner wall of the top, the first side wall, and the third side wall of the cold storage house.

Therefore, the whole cold storage house adopts a sandwich structure. An area for allowing articles to be stored in is arranged in the center, and isolated from the outside of the cold storage house through the 11-layer wall material. The sandwich area is positioned at the top of the cold storage house and in two opposite side walls of the cold storage house. The area for allowing articles to be stored in and the sandwich area are isolated only through the second metal layer and the protective layer, and the sandwich area and the outside of the cold storage house are mutually isolated through the rest 9 layer structures of the wall material.

The thickness (i.e., the distance between the protective layer and the buffer layer on one side of the inner wall of the cold storage house) of the sandwich area can be determined according to the volume of the heat exchanger and the ventilating device.

In a class of this embodiment, the heat exchanger and the ventilating device are positioned in the sandwich area at the top of the cold storage house. Cold air is output from the ventilating device, reaches the front side from the rear side of the cold storage house along the sandwich area at the top of the cold storage house and then flows towards the sandwich area on the side wall of the cold storage house, reaches the rear side from the front side of the cold storage house along the sandwich area on the side wall of the cold storage house, and then flows back to the air inlet of the ventilating device.

In the cold storage house with the sandwich structure, a heat exchange and a fan can be placed in the area for allowing articles to be stored in, or only a fan is arranged in the area for allowing articles to be stored in. Only the heat exchange, but not air circulation is performed between the area for allowing articles to be stored in and the sandwich area, that is, the heat exchange but not mass exchange is carried out, so as to be more favorable for fresh-keeping of the stored articles.

Theoretically, the heat exchange can be placed at the optional position of the air passage, and preferably, the heat exchange is placed near the ventilating device, and adjacently to the air inlet or the air outlet of the ventilating device.

Gas can be filled in the thermal insulation layer of the wall material and the cold storage house, and except for the thermal insulation layer and the sandwich area, the rest layers are closely stuck in sequence and bonded with an adhesive.

When the inflatable cold storage house is used, the thermal insulation layer is filled with at least one of dry air, high-purity nitrogen, and inert gas, and then the inflatable cold storage house can be used in a hoisting manner. When the inflatable cold storage house is not used, after the gas is evacuated to 80%-90%, the inflatable cold storage house can be collected or transported in an integrally folded manner. The inflatable cold storage house has the advantages of small volume and small folding prestress after being folded.

DETAILED DESCRIPTION OF THE EMBODIMENTS

Figure 1:
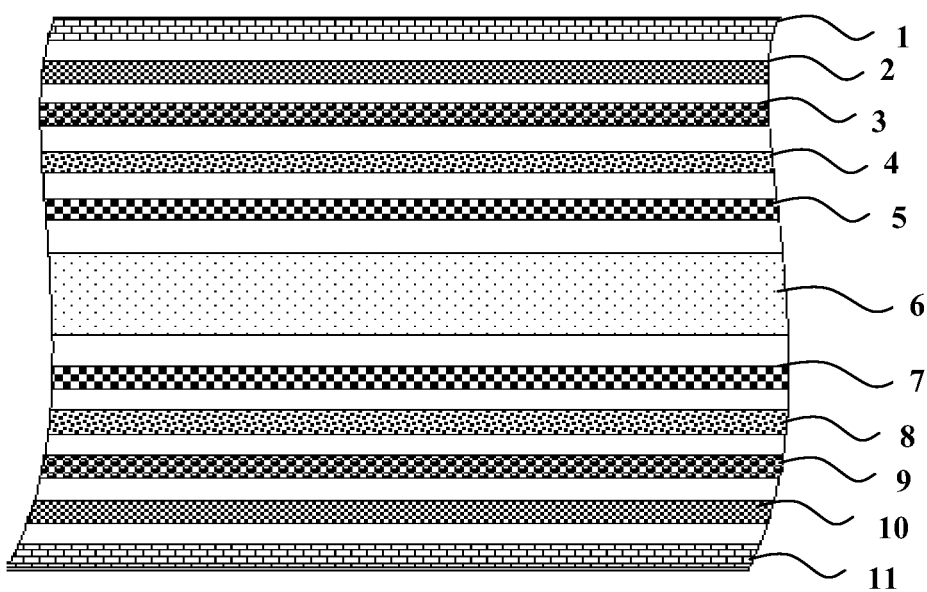
FIG. 1 is a partial cross-section view of an inflatable wall material according to one embodiment of the invention in which a gap is left between every two layers for the purpose of differentiation.

As shown in FIG. 1, an inflatable wall material comprises a thermal insulation layer 6. A first metal layer 5, a first barrier layer 4, a first buffer layer 3, a first protective layer 2, and a first metal layer 1 are arranged on the top side (The top side is relative to the position in the figure, and serves as one side of the outer wall of the cold storage house when in use) of the thermal insulation layer 6 in sequence, and a second metal layer 7, a second barrier layer 8, a second buffer layer 9, a second protective layer 10, and a second metal layer 11 are arranged on the bottom side (The bottom side is relative to the position in the figure, and serves as one side of the inner wall of the cold storage house when in use) of the thermal insulation layer 6 in sequence.

The first metal layer 5, the first barrier layer 4, the second metal layer 7, and the second barrier layer 8 constitute an air-tight space. The thermal insulation layer adopts hollow three-dimensional crimp polypropylene elastic cotton, the polypropylene elastic cotton is filled in the air-tight space, and the overall thickness of the thermal insulation layer is 60 mm.

The first metal layer 5, the first metal layer 1, the second metal layer 7, and the second metal layer 11 adopt aluminum foil with thickness of 0.007 mm.

Both the first barrier layer 4 and the second barrier layer 8 adopt polyvinyl chloride film with thickness of 0.12 mm;

Both the first protective layer 2 and the second protective layer 10 adopt nylon cloth with thickness of 1 mm;

Both the first buffer layer 3 and the second buffer layer 9 adopt expanded polyethylene layer with thickness of 10 mm;

Each layer and the edges required to be hermetically sealed are bonded with anti-oxidant latex.

Figure 2:
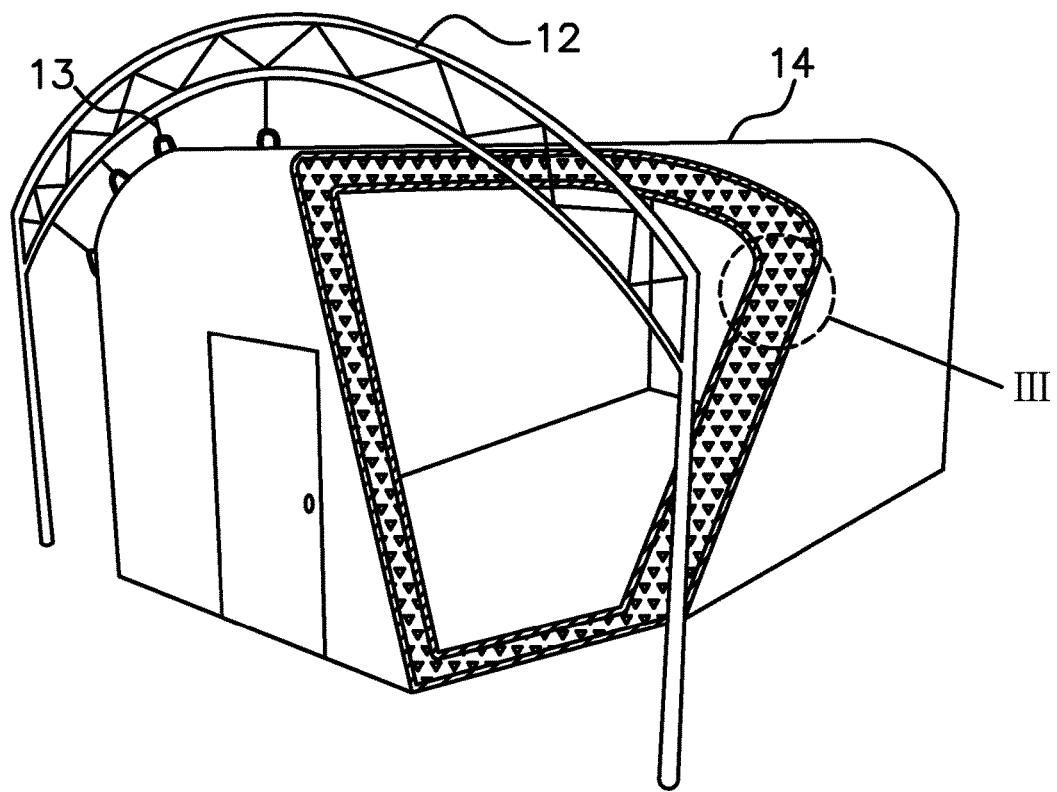
FIG. 2 is a broken-out section view of a cold storage house built with a inflatable wall material according to one embodiment of the invention.

As shown in FIG. 2, an inflatable cold storage house 14 comprises a bottom, four walls, and a top. The bottom, the four walls, and the top adopt the inflatable wall material respectively.

The four walls are encircled by a front side wall, a right side wall, a rear side wall, and a left side wall which are connected in sequence. The bottom adopts an integral structure with the front side wall and the rear side wall, that is, the bottom, the front side wall, and the rear side wall are formed by bending a piece of wall material. The top adopts an integral structure with the left side wall and the right side wall, and is a tegular vault. Each wall material is provided with an inflation inlet communicated with the thermal insulation layer, a sealing plug is arranged at the opening part of the inflation inlet, and a door is arranged on the front side wall.

To ensure the overall strength of the cold storage house, a plurality of portal supporting frames 12 are arranged, and the top and the side walls are tightened on the portal supporting frame 12 through slings 13. More portal supporting frames 12 can be arranged according to the external dimension of the cold storage house, one portal supporting frame 12 is only schematically drawn in the figure, and certainly, the supporting frame also can adopt other shapes.

Figure 3:
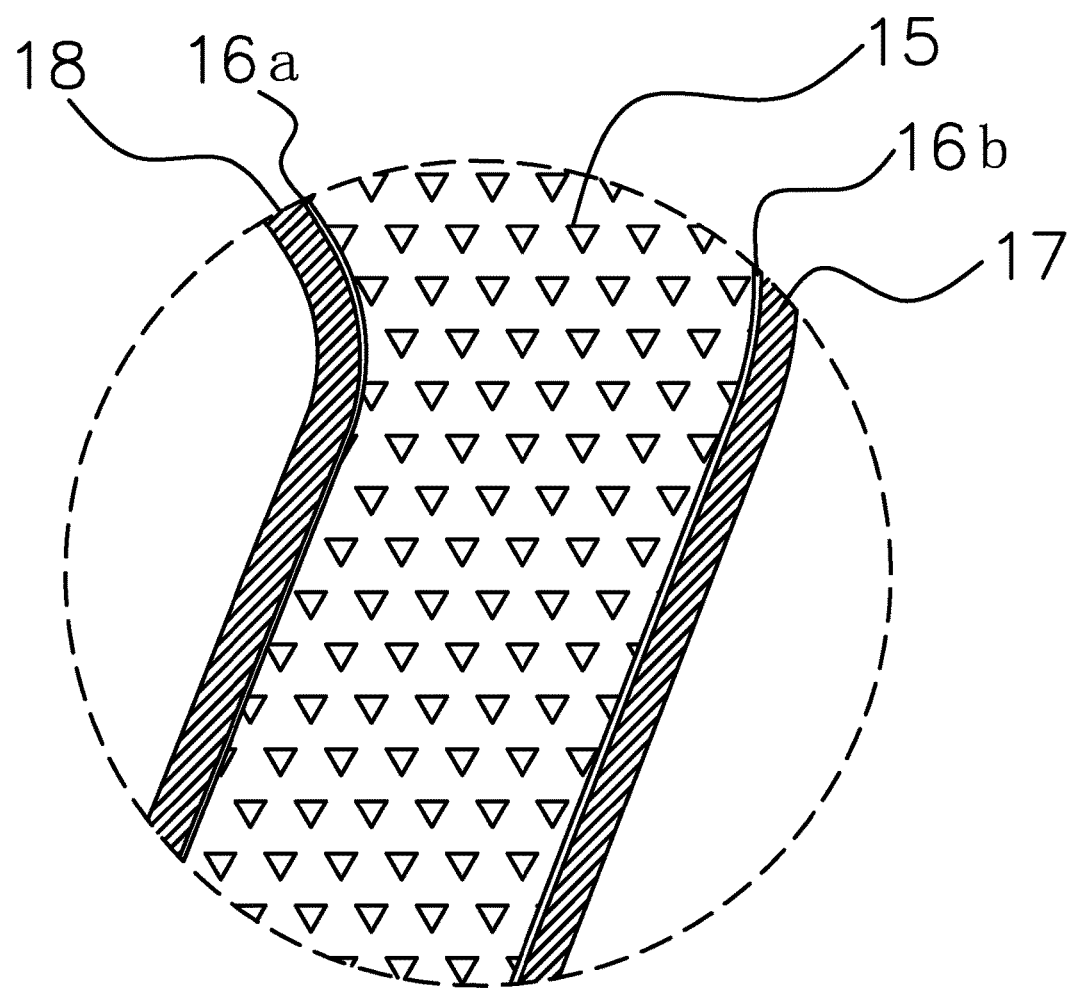
FIG. 3 is an enlarged drawing of the A part in FIG. 2.

As shown in FIG. 3, an inflated thermal insulation layer 15 is arranged in the middle of the wall material, and a layer body 16a and a layer body 16b which constitute the air-tight space are arranged on two sides of the thermal insulation layer 15.

Combined with FIG. 1, the layer body 16a comprises the second metal layer 7 and the second barrier layer 8, and the layer body 16b comprises the first metal layer 5 and the first barrier layer 4.

Other structural layers 18 are positioned on the inner side of the layer body 16a, and comprise the second buffer layer 9, the second protective layer 10, and the second metal layer 11; other structural layers 17 are positioned on the outer side of the layer body 16b, and comprise the first buffer layer 3, the first protective layer 2, and the first metal layer 1.

As to the inflatable cold storage house, the thermal insulation layer is filled with dry air and then used in a hoisting manner.

Figure 4:
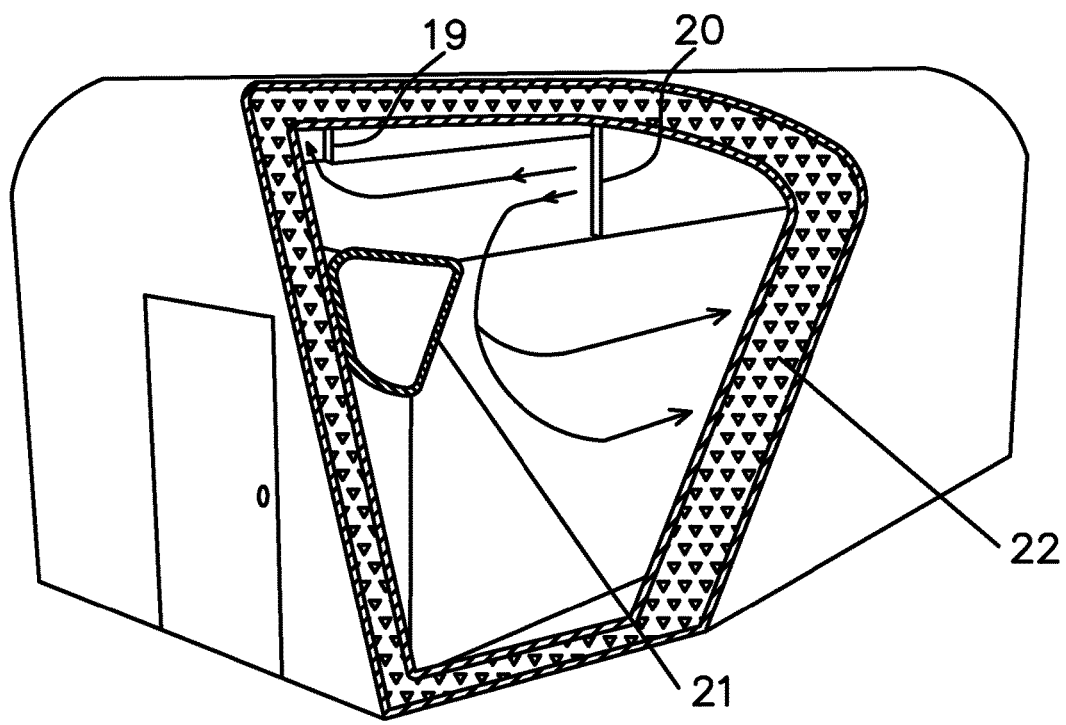
FIG. 4 is a broken-out section view of a cold storage house according to one embodiment of the invention.
Figure 5:
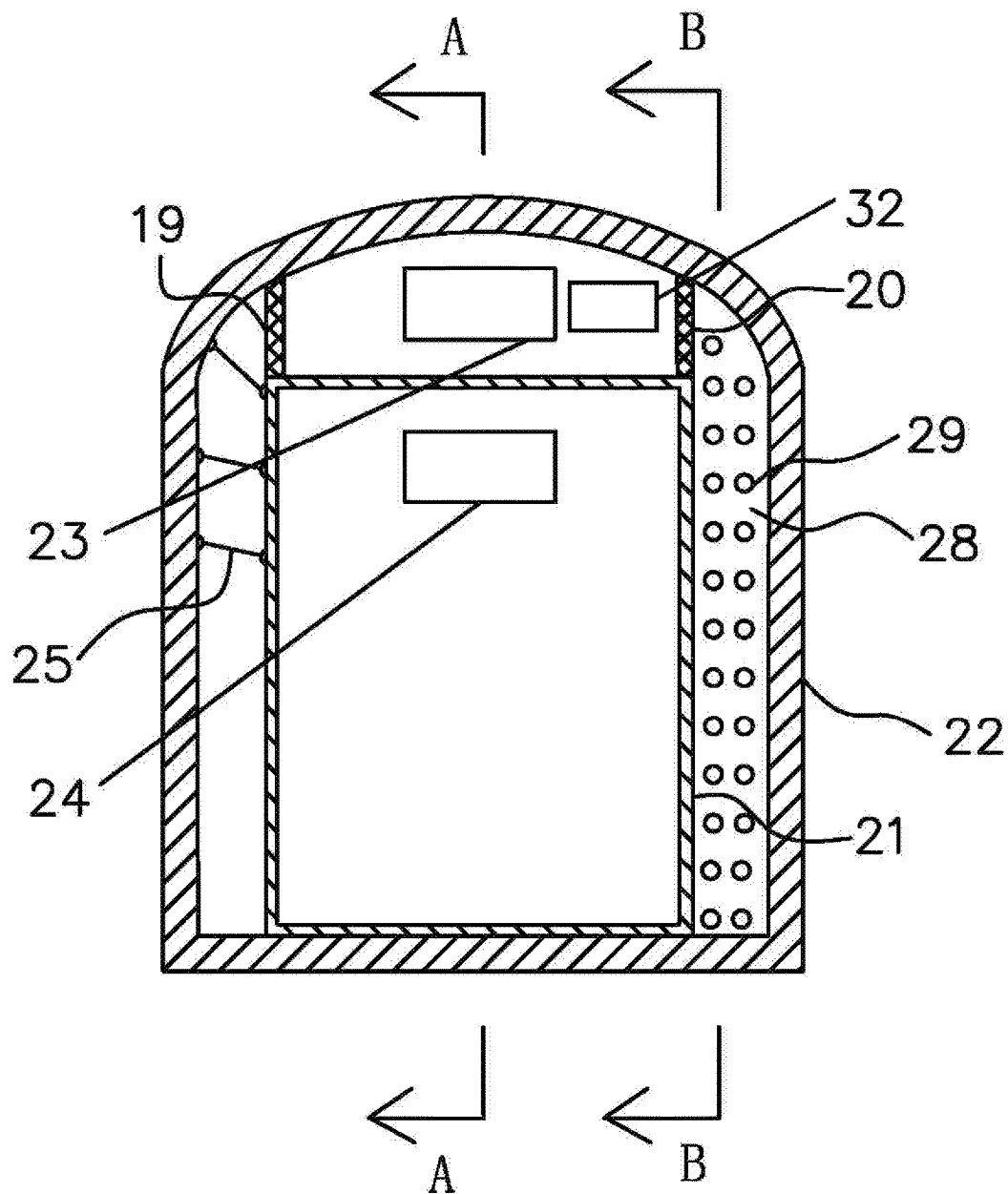
FIG. 5 is a cross-section diagram of the cold storage house in FIG. 4.

As shown in FIGS. 4-7, as another example, in the top, the left side wall, and the right side wall of the cold storage house, a gap is left between the protective layer and the second metal layer and the buffer layer which are positioned on the inner side of the inner wall of the cold storage house, i.e., a sandwich structure. As shown in FIG. 4, a first layer structure 21 comprises the second protective layer 10 and the second metal layer 11, and a second layer structure 22 positioned at the top, on the left side wall, and the right side wall comprises the rest 9 layers in the wall material, that is, the second buffer layer 9, the second barrier layer 8, the second metal layer 7, the thermal insulation layer 6, the first metal layer 5, the first barrier layer 4, the first buffer layer 3, the first protective layer 2, and the first metal layer 1 are arranged in sequence from inside to outside. The first layer structure 21 and the second layer structure 22 are tightened through a sling 25.

To form an effective circulated air passage in the cold air circulation passage, a first guide plate 19 and a second guide plate 20 can be arranged, so that the sandwich structure is divided into the cold air circulation passage, and the arrow in FIG. 4 is the flow direction of air in the cold air circulation passage.

The first guide plate 19 and the second guide plate 20 generally adopt foldable plastic films, and are positioned on the left side and the right side of the sandwich structure at the top, respectively. The sandwich structure at the top is isolated from the sandwich structures on the left side wall and the right side wall, and openings are left only at the parts adjacent to the front side and the rear side of the sandwich structure at the top.

To ensure the reasonable airflow distribution, grid plates 28 (indicated on only one side in the figure, the other side is omitted) are arranged in the sandwich structures on the left side wall and the right side wall of the cold storage house, and each grid plate 28 is provided with a ventilation hole 29.

The ventilation hole 29 can adopt various shapes, and its diameter is generally 3 cm when the ventilation hole 29 is a circular hole.

The whole cold storage house adopts a sandwich structure, an area for allowing articles to be stored in is arranged in the center, and isolated from the outside of the cold storage house through the wall material with an 11-layer structure. The sandwich area is positioned at the top, in the left side wall, and the right side wall of the cold storage house. Namely, a first gap, a second gap, and a third gap are respectively positioned at the top, in the left side wall, and the right side wall of the cold storage house. The area for allowing articles to be stored in and the sandwich area are isolated only through the second protective layer 10 and the second metal layer 11, and the sandwich area and the outside of the cold storage house are mutually isolated through the rest 9 layer structures of the wall material.

A heat exchanger 32 and a first fan 23 are arranged in the sandwich area at the top of the cold storage house. The heat exchanger 32 is positioned at an air inlet of the first fan 23, and connected with a refrigerating apparatus outside the cold storage house through a heat exchange medium pipeline, and a second fan 24 is arranged in the area for allowing articles to be stored in and used for equalizing the temperature in the area as well as allowing air to flow.

Figure 6:
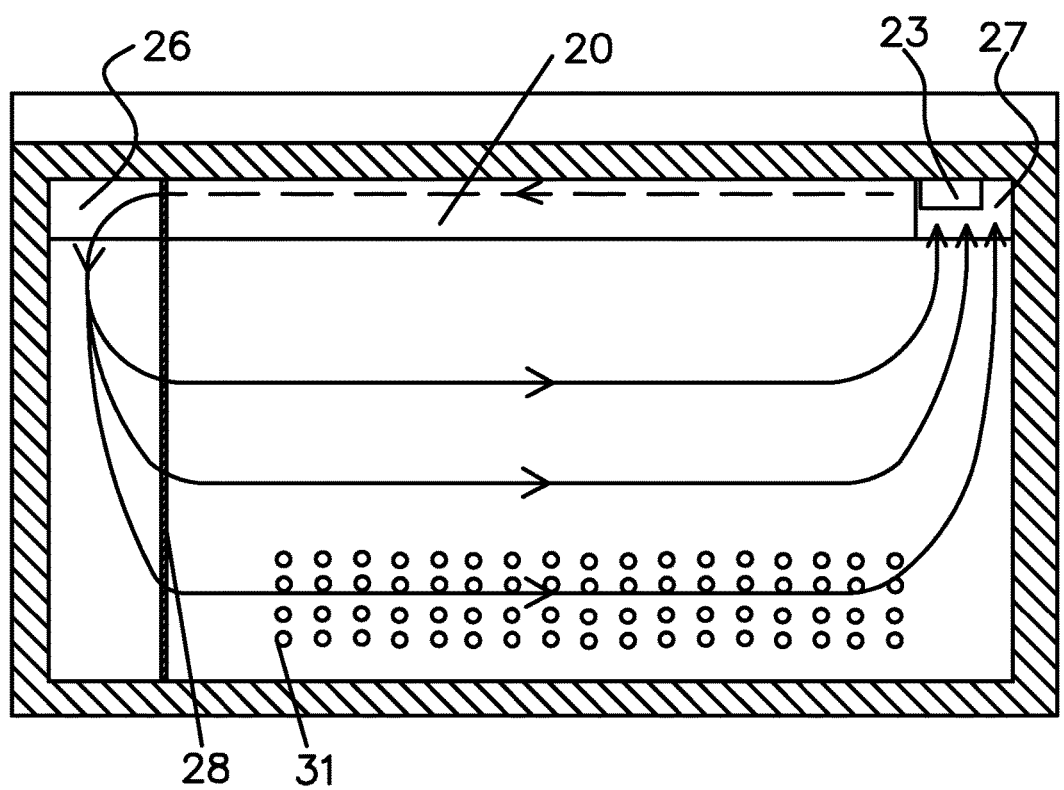
FIG. 6 is a B-B line cutaway view in FIG. 5.
Figure 7:
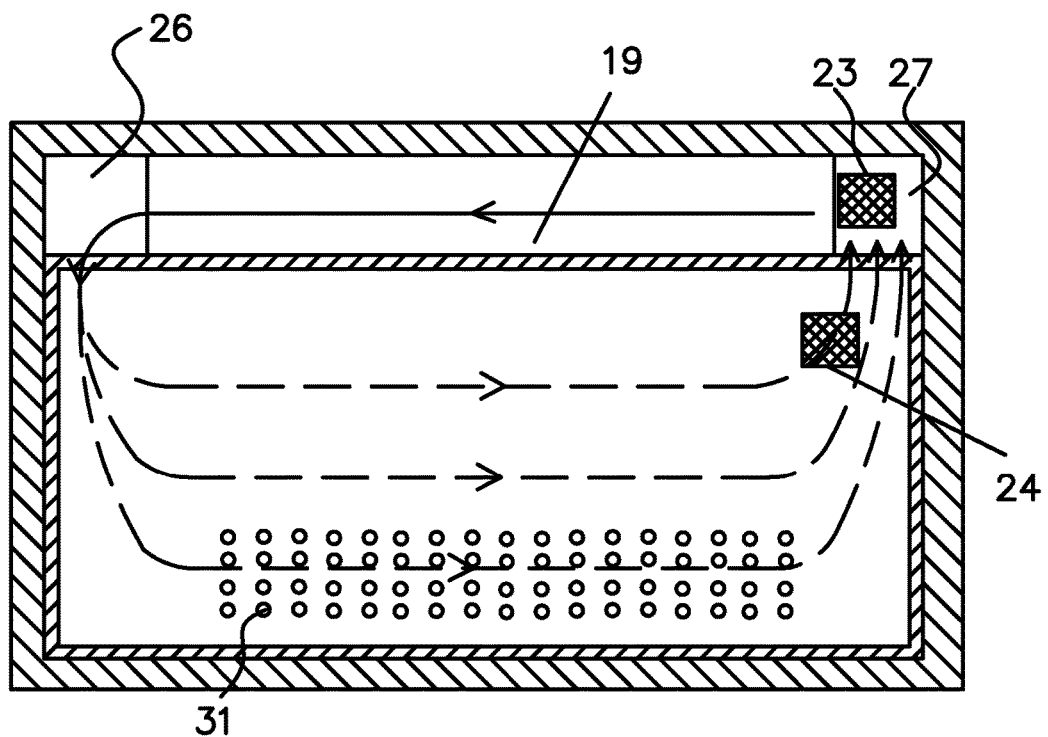
FIG. 7 is an A-A line cutaway view in FIG. 5.

The directions of arrows in FIGS. 6-7 are cold air flow directions. Cold air is output from the first fan 23, reaches the front side from the rear side of the cold storage house along the sandwich area at the top of the cold storage house and then flows towards the sandwich area on the side wall of the cold storage through an opening 26, so that the temperature of airflow at the top and the bottom of the sandwich area on the side wall are relatively balanced after being blocked by the grid plates 28, and then the airflow reaches the rear side from the front side of the cold storage house through the ventilation hole 29 along the sandwich area on the side wall of the cold storage house, and flows back to the air inlet of the first fan 23 through an opening 27.

In the cold storage house with the sandwich structure, only the heat exchange, but not air circulation is performed between the area for allowing articles to be stored in and the sandwich area, that is, the heat exchange but not mass exchange is carried out, so as to be more favorable for fresh-keeping of the stored articles.

However, when the temperature of articles or food required to be stored is higher or the good in quantity are warehoused at the primary stage, and the cold-heat exchange capacity between the sandwich layer and the cold storage house is large, a ventilation opening 31 capable of being selectively opened or closed is formed at the position of the first layer structure 21 adjacent to the bottom of the cold storage house to reduce the temperature as possible, so that the air circulation between the area for allowing articles to be stored in and the sandwich area can be realized through the ventilation opening 31, and at the moment, both the heat exchange and mass exchange are carried out between the inside of the cold storage house and the first layer structure 21. After the temperature of the goods in the cold storage house is reduced, the cold energy required for stabilizing the temperature in the cold storage house is lower, and the ventilation opening 31 can be fully or locally closed at the moment, so as to achieve the purpose of mainly transferring heat or transferring heat but not mass. When the cold air in the jacket and the goods in the cold storage house are maintained at the optimal balanced temperature level, the heat transfer but not mass transfer is carried out, so as to enable the moisture of goods not to be carried away, and furthermore, the frost in an evaporator in the air conditioner can also be reduced, so that the energy consumption of defrosting is reduced, and the cold-dispersing effect of the evaporator is enhanced.

The ventilation opening 31 can be circular or adopt other proper shapes, and when the ventilation opening 31 is circular, its diameter ranges from 5 cm to 10 cm. According to the requirements of air flow between the area for allowing articles to be stored in and the sandwich area of the cold storage house or the requirements of cooling rate at the area for allowing articles to be stored in, the area of the ventilation opening 31 can be appropriately adjusted.

Figure 8:
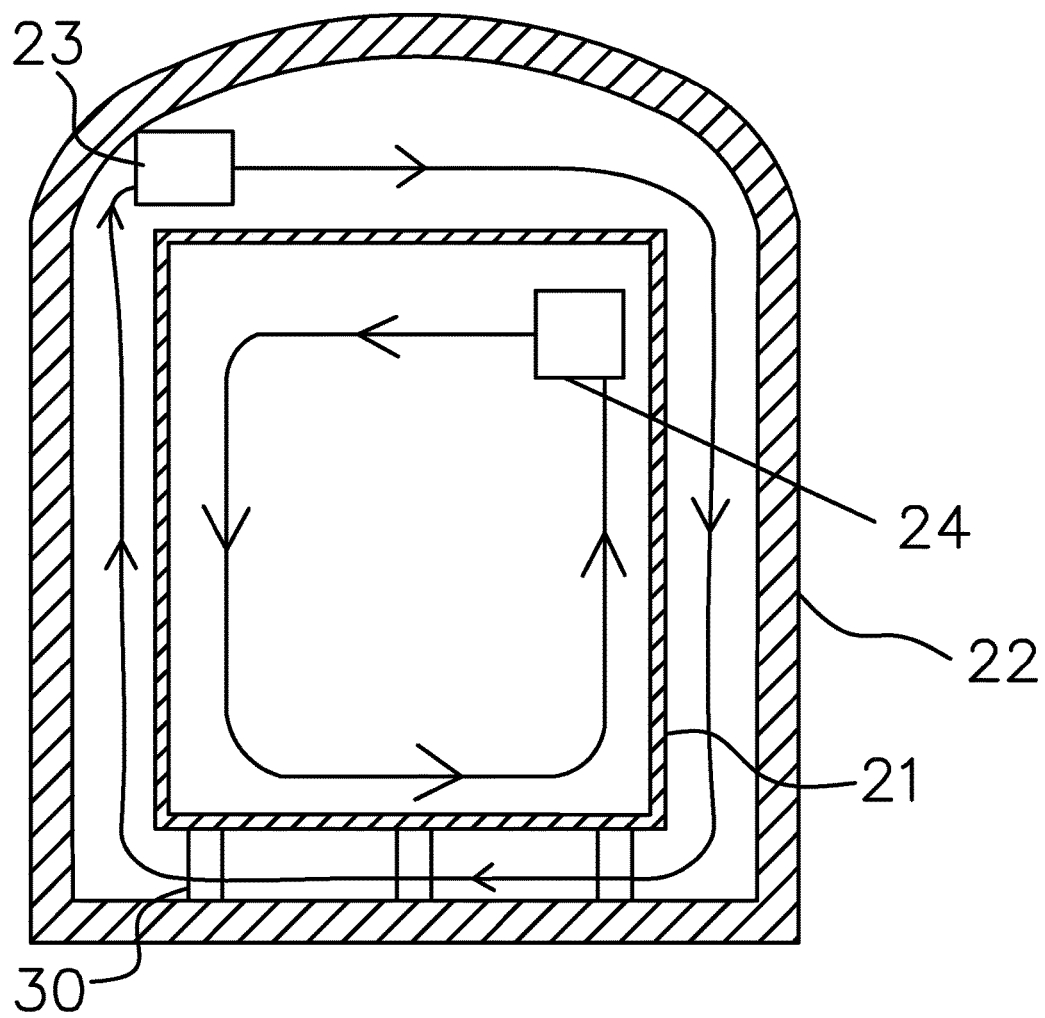
FIG. 8 is a cross-section diagram of a cold storage house according to another embodiment of the invention.

As shown in FIG. 8, as a third example, a sandwich structure is also adopted at the bottom of the cold storage house and supported through a bracket 30. Thus, cold air is output from the first fan 23, flows to the bottom from the side wall of the cold storage house along the sandwich area at the top of the cold storage house, and then flows back to the air inlet of the first fan 23 after flowing through the sandwich structure of the other side wall. The airflow direction in the area for allowing articles to be stored in is opposite to that in the sandwich structure via the air outlet direction of the second fan 24 in the area for allowing articles to be stored in, so as to enhance the heat exchange effect.

The first layer structure 21 and the second layer structure 22 are stuck with each other only at the front side wall of the cold storage house, the door capable of being opened or closed is arranged on the front side wall of the cold storage house, thus the side wall with the door is stuck at least between the first layer structure 21 and the second layer structure 22 at the periphery of the door, that is, a sandwich structure is not provided.

In this example, the guide plates and the grid plates are omitted, and the area of the sandwich structure is larger, so that the heat-exchange effect between the area for allowing articles to be stored in and the sandwich area is better.

Although the above is described only for the inflatable wall material and the inflatable cold storage house employing the wall material, it is understandable that after the doors, windows and pipes (communicated with the outside respectively) of the cold storage house are hermetically sealed, the wall material is also suitable for the inflatable air-conditioned storehouse, and the structure of the inflatable air-conditioned storehouse is basically same as that of the inflatable cold storage house. In addition, to balance and reduce the pressure difference inside and outside the air-conditioned storehouse, a pressure safety valve and a pressure balancing air-conditioned bag are also arranged.

The invention claimed is:

1. An inflatable wall for building construction, the inflatable wall comprising:
   a) a thermal insulation layer comprising two sides;
   b) a first metal layer;
   c) a barrier layer;
   d) a buffer layer;
   e) a protective layer;
   f) a second metal layer; and
   g) an air inlet/outlet comprising an opening part;
   wherein:
   the first metal layer, the barrier layer, the buffer layer, the protective layer, and the second metal layer are arranged on each of the two sides of the thermal insulation layer in sequence;
   the barrier layer employs air-tight materials;
   the first metal layer and the thermal insulation layer are bonded to each other by an adhesive;
   the thermal insulation layer comprises hollow three-dimensional crimp cotton;
   the air inlet/outlet is disposed on an outer surface of the inflatable wall and is connected to the thermal insulation layer;
   a sealing plug is disposed on the opening part of the air inlet/outlet;
   the thermal insulation layer is adapted to receive air via the air inlet/outlet and become inflated, wherein the hollow three-dimensional crimp cotton is filled with air; and
   the thermal insulation layer is adapted to be deflated via the air inlet/outlet, wherein air in the hollow three-dimensional crimp cotton is extracted out via the air inlet/outlet; and
   a passage is arranged between the protective layer and the buffer layer, and the passage is adapted for air circulation.

2. The inflatable wall of claim 1, wherein
   the thermal insulation layer employs polypropylene cotton, polyester cotton, acrylic cotton, polyamide cotton, or a mixture thereof;
   both the first metal layer and the second metal layer are made from aluminum-titanium alloy, aluminum foil, or a mixture thereof;
   the barrier layer is made from polyvinyl chloride film, polyethylene film, polypropylene film, or a mixture thereof;
   the protective layer is made from polyvinyl chloride cloth, nonwoven fabric, rainproof silk, fabric-base silicon rubber cloth, nylon cloth, or a mixture thereof; and
   the buffer layer is made from expanded polyethylene, expanded crosslinked polyethylene, foamed rubber, soft expanded polyurethane, or a mixture thereof.

3. The inflatable wall of claim 2, wherein
   a thickness of the thermal insulation layer is between 50 and 200 mm;
   a thickness of the first metal layer or the second metal layer is between 0.006 and 0.009 mm;
   a thickness of the barrier layer is between 0.05 and 0.12 mm;
   a thickness of the buffer layer is between 5 and 15 mm; and
   a thickness of the protective layer is between 1 and 1.5 mm.

4. The inflatable wall of claim 1, wherein the passage comprises a passage inlet and a passage outlet, and the passage inlet and the passage outlet are adapted to be respectively connected to an inlet and an outlet of a ventilating device.

5. An inflatable cold storage house, comprising: a top, a bottom, and four walls, wherein the top, the bottom, and the four walls employ an inflatable wall, the inflatable wall comprising:
   a) a thermal insulation layer comprising two sides;
   b) a first metal layer;
   c) a barrier layer;
   d) a buffer layer;
   e) a protective layer;
   f) a second metal layer; and
   g) an air inlet/outlet comprising an opening part;
   wherein:
   the first metal layer, the barrier layer, the buffer layer, the protective layer, and the second metal layer are arranged on each of the two sides of the thermal insulation layer in sequence;
   the barrier layer employs air-tight materials;
   the first metal layer and the thermal insulation layer are bonded to each other by an adhesive;
   the thermal insulation layer comprises hollow three-dimensional crimp cotton;
   the air inlet/outlet is disposed on an outer surface of the inflatable wall and is connected to the thermal insulation layer;
   a sealing plug is disposed on the opening part of the air inlet/outlet;
   the thermal insulation layer is adapted to receive air via the air inlet/outlet and become inflated, wherein the hollow three-dimensional crimp cotton is filled with air;
   the thermal insulation layer is adapted to be deflated via the air inlet/outlet, wherein air in the hollow three-dimensional crimp cotton is extracted out via the air inlet/outlet; and a passage is arranged between the protective layer and the buffer layer, and the passage is adapted for air circulation.

6. The inflatable cold storage house of claim 5, wherein the four walls comprise a first side wall, a second side wall, a third side wall, and a fourth side wall;

the second side wall is positioned on a front side of the cold storage house and provided with a door;

the fourth side wall is positioned on a rear side of the cold storage house; and the first side wall and the third side wall are positioned on a left side wall and a right side wall of the cold storage house, respectively.

7. The inflatable cold storage house of claim 6, wherein a first gap is formed between the protective layer and the buffer layer of the top of the cold storage house, a second gap is formed between the protective layer and the buffer layer of the first side wall of the cold storage house, and a third gap is formed between the protective layer and the buffer layer of the third side wall of the cold storage house.

8. The inflatable cold storage house of claim 7, wherein a guide plate is disposed in the first gap formed between the protective layer and the buffer layer of the top of the cold storage house; and a heat exchanger and a ventilating device are positioned in the first gap.

9. The inflatable cold storage house of claim 5, wherein a grid plate is arranged in the passage, and the grid plate is provided with a plurality of ventilation holes.

10. The inflatable cold storage house of claim 5, wherein the passage comprises a passage inlet and a passage outlet, and the passage inlet and the passage outlet are adapted to be respectively connected to an inlet and an outlet of a ventilating device.

11. The inflatable cold storage house of claim 9, wherein the passage comprises a passage inlet and a passage outlet, and the passage inlet and the passage outlet are adapted to be respectively connected to an inlet and an outlet of a ventilating device.

* * * * *